May 6, 1969  E. H. PHILLIPS  3,442,290
RELIEF VALVE

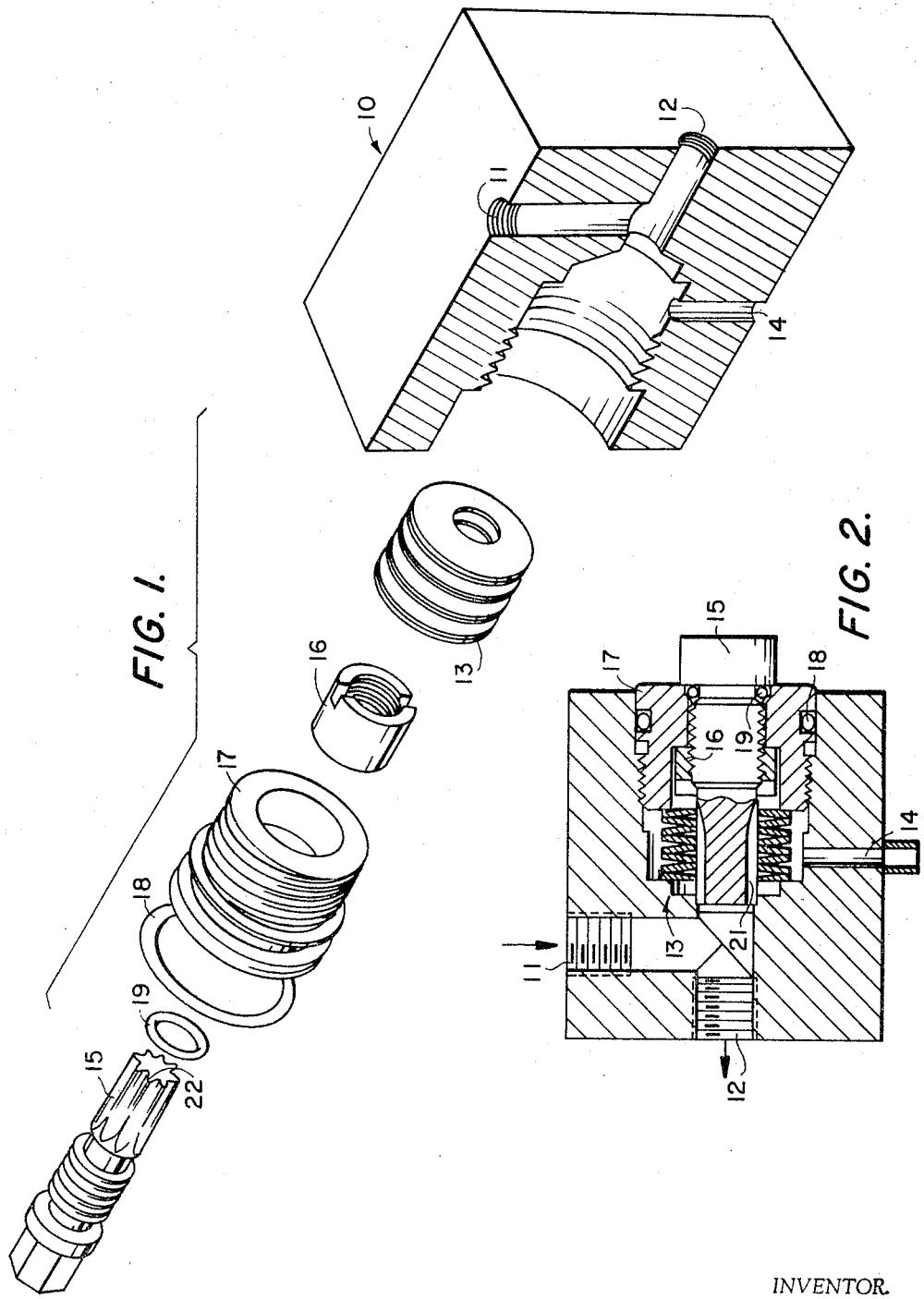

Filed Oct. 20, 1967

INVENTOR.
EDWARD H. PHILLIPS

ATTORNEYS

United States Patent Office 3,442,290
Patented May 6, 1969

3,442,290
RELIEF VALVE
Edward H. Phillips, Los Altos, Calif., assignor to Tydeman Machine Works, Inc., Redwood City, Calif., a corporation of California
Filed Oct. 20, 1967, Ser. No. 676,912
Int. Cl. F16d *15/00;* F16k *17/00;* F16h *21/04*
U.S. Cl. 137—596.2                    12 Claims

ABSTRACT OF THE DISCLOSURE

A relief valve comprises at least one pair of resilient washers arranged to have peripheral portions thereof contact each other and further arranged to form a chamber therebetween. When fluid pressure in such chamber exceeds a predetermined level, the washers expand to permit fluid to flow therethrough to return the pressure to such level.

---

Conventional relief valves generally comprise a spring biased spool arranged to permit fluid to flow thereby when the pressure of such fluid exceeds a predetermined level. In particular, the increased fluid pressure will function to move the spool against the spring's force to open the valve and dump excess fluid pressure into a reservoir in pressure relief valve applications, for example.

Oftentimes conventional relief valves of this type cannot be accurately toleranced and calibrated to achieve the precise relief functions required in modern day automatic machine tool applications, for example. Also, such valves are expensive to manufacture and service. In addition, spool type relief valves exhibit "hunting" and related problems and do not always afford an expeditious response when they are actuated.

This invention overcomes many of the above, briefly mentioned problems by providing a relief valve comprising at least one pair of resilient washers arranged to have the peripheral portions thereof contact each other. The washers are further arranged to form a chamber therebetween which communicates with a pressurized fluid source via a suitably arranged inlet means. When the fluid pressure in such chamber exceeds a predetermined level, the washers expand to permit fluid to flow therethrough.

When the relief valve is utilized in pressure relief valve applications, a relief port is arranged to receive the fluid which is relieved upon expansion of the washers. The relief valve of this invention is further adapted for use in a servo-valve as will be hereinafter more fully explained.

An object of this invention is to provide closely toleranced and calibrated relief valves comprising at least one pair of resilient washers forming a fluid pressure retaining chamber therebetween to precisely control the release of fluid pressure therefrom.

Another object of this invention is to provide a noncomplex and durable relief valve which is inexpensive to manufacture and service.

A further object of this invention is to provide a relief valve which avoids "hunting" and related problems normally encountered in connection with the utilization of conventional spring biased spool type relief valves.

A still further object of this invention is to provide a pressure relief valve employing the relief valve of this invention.

A still further object of this inventtion is to provide a servo-valve employing the relief valve of this invention.

Other objects of this invention will become apparent from the following description and accompanying drawings wherein:

FIG. 1 is an exploded, isometric view illustrating a pressure relief valve employing the preferred relief valve embodiment of this invention therein;

FIG. 2 is a cross-sectional view of the pressure relief valve as it would appear in assembled form;

*Description of the preferred embodiments*

Figure 3:
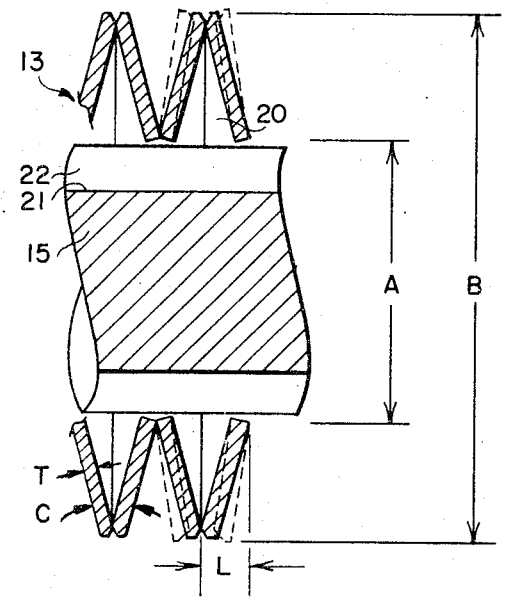
FIG. 3 is an enlarged view of the preferred relief valve embodiment.

FIGS. 1–3 illustrate a pressure relief valve employing a plurality of the preferred relief valve embodiment of this invention therein. The pressure relief valve comprises a housing 10 having an inlet means 11 arranged to communicate with an outlet means 12. The relief valve or valve means of this invention, generally shown at 13, is suitably arranged to maintain the pressure of the fluid flowing from the inlet means to the outlet means at a predetermined level. The inlet means may be suitably connected to a conventional pump means (not shown) to communicate a pressurized fluid thereto. The outlet means may be arranged to actuate a fluid motor or the like.

The housing further comprises a relief port means 14 formed therein and arranged to communicate with a reservoir or the like (not shown). The valve means comprises at least one pair of stacked, resilient washers suitably mounted on a shank of a bolt 15. The bolt has a lock nut 16 threadably attached thereto to retain an adjusting means or collar member 17 at a predetermined axial position thereon. Member 17 is threadably attached to housing 10 and operatively associated with the valve means to selectively compress the washers thereof for relief adjustment purposes. Conventional O-ring seals 18 and 19 may be suitably arranged in the manner illustrated for fluid sealing purposes.

The pressure relief valve may be assembled by first inserting collar member 17 onto the shank of bolt 15. If so desired, the member could be threadably attached to the bolt. The collar member is then locked at a predetermined axial position on the bolt by lock nut 16. The washers comprising the valve means are then mounted onto the tubular shank of the bolt. This sub-assembly is then threadably attached to housing 10 to impart the desired compression to the washers via contact with collar member 17.

Each pair of circular washers are arranged to contact each other at outer peripheral portions thereof. In this particular embodiment of the invention, the washers form an inverted V-shaped chamber 20 therebetween (FIG. 3). The peripheral portions of at least one of the washers are preferably chamfered to provide a substantial line contact between the abutting washers. Such an arrangement will provide a substantially instantaneous response when the washers expand to relieve fluid pressure therethrough. A washer of a first pair of washers has circular inner portions thereof arranged to abut adjacent circular inner portions (at diameter A in FIG. 3) of a washer of a second pair of washers. Such inner portions could also be chamfered if so desired.

The above mentioned chamber is arranged to communicate with the inlet and outlet means via axial slots 21 suitably formed on the shank of the bolt. The slots are formed by lands 22 constructed and arranged to terminate radially to substantially coincide with the inside diameter A of the washers. A slight clearance for assembly purposes may be provided between the washers and shank since seal 19 will prevent fluid flow out of the valve. Alternatively, slots 21 comprise passages and ports suitably drilled in bolt 15.

In operation, pressurized fluid is suitably communicated to the chamber formed between each pair of washers to aid in urging the inner portions of adjacent washers into abutting relationship to prevent fluid from escaping therethrough. When the fluid pressure in chamber 20 exceeds a predetermined level, each pair of washers will expand to the dotted line position illustrated in FIG. 3 to relieve excess pressure to outlet port 14. When the pressure is reduced to the predetermined, maximum level the resilent washers will retract automatically to the normal full line position. Alternatively, port 14 could constitute the inlet means and inlet means 11 or 12 could constitute the exhaust port, i.e. the fluid flow could be reversed in a particular system.

In order to afford the desired fluid pressure relief functions for normal applications, various design parameters are preferably maintained within selected ranges. For example, if a washer is not suitably designed it may tend to "cricket," i.e. reverse bend, when it is subjected to a high fluid pressure. For example, the outside diameter B of the washer is preferably kept within an approximate range of from 1.25 to 4.0 times the circular apertures forming the washer's inner diameter A. The preferred range is one wherein B is substantially equal to 1.5A to 2.5A.

The axial length L of each washer is preferably selected from a range approximating from 1.5T to 3.0T, the letter T depicting the wall thickness of the washer. Such thickness is preferably constant in most applications but may be varied on a washer for certain relief valve applications. The preferred range therefor in one wherein L is equal to from 2.0T to 2.5T.

It should be further noted that the particular material utilized for fabricating the washers, e.g. spring steel, should be also taken into consideration prior to the application of a washer to a particular relief valve application. Also, the shape of the washers can be varied so long as the desired relief valve functions are obtained. For example, FIG. 3 illustrates a conicaly shaped washer having a straight profile in cross-section at each end thereof. Such profile could be at least partially curved, either concave or convex, or could comprise straight portions arranged to intersect to form one or more angles (e.g. substantially inverted L shape). Although the washers are preferably of the Belleville type, i.e., circular, it should be understood that they could comprise a polygonal shape.

Figure 4:
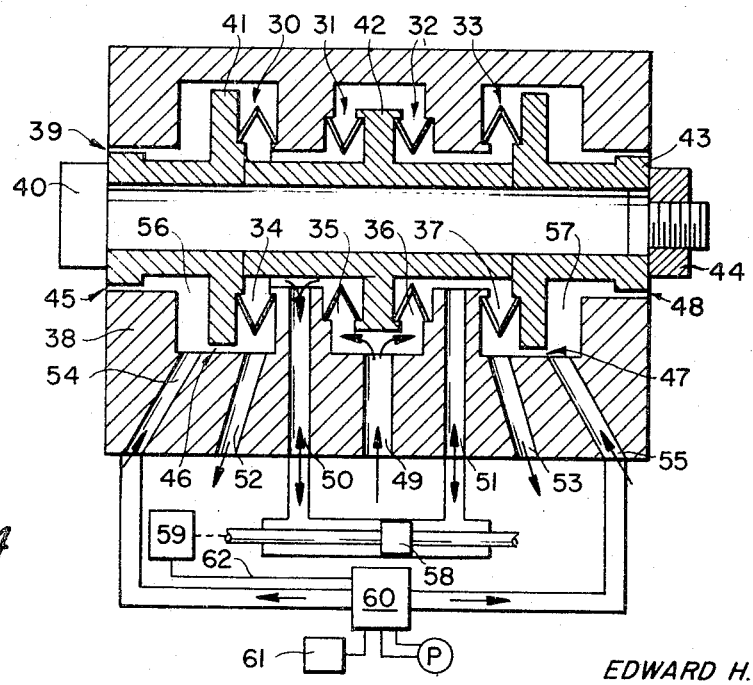
FIG. 4 is a cross-sectional view of a servo arrangement employing the preferred relief valve embodiment of this invention therein.

FIG. 4 is a cross-sectional view of a "live" servo-valve arrangement employing a plurality of valve means 30–37 therein. Each valve means is identical to valve means 13 of the first described pressure relief valve. The servo-valve arrangement is employed for amplifying a small power input at input means 61 to substantially instantaneously actuate a heavy machine tool element 59 via a servo-motor 58. The machine tool element could comprise a conventional cross-slide or workpiece for an automatic turret lathe, for example.

As will be hereinafter more fully described, the servo arrangement preferably comprises feed back linkage means 62 whereby movement of the servo-motor and machine tool will function to cause simultaneous restoration of a servo-valve means 39 to its initial, neutral position. In this manner, a predetermined movement of the controlled power input will be accompanied by a proportional movement of the the machine tool. A standard index or calibration means (not shown) could be utilized to gage the power input.

Conventional hydraulic servo arrangements generally comprise a spool-type servo-valve. Suitably arranged lands and ports thereof function to move a servo-motor in response to a command signal to in turn actuate a machine tool element. Such valves are generally expensive and difficult to fabricate primarily due to the close tolerances which must be designed into the valve. U.S. Patent No. 2,730,074 for example more fully discusses various problems normally encountered when a servo arrangement is utilized for machine tool operations of the type herein contemplated.

The FIG. 4 servo arrangement overcomes many such prior art problems by substantially providing for hysteresis-free flow application of hydraulic signals. In particular, servo-valve means 39 comprises valve means 30–37 arranged to form chambers 34–37, respectively, each chamber corresponding to chamber 20 of the FIGS. 1–3 pressure relief valve. The valve means are further arranged in a housing 38 to normally center a spool of the servo-valve in its normal, neutral position therein. The spool may comprise a bolt 40 having cylindrical collars 41–43 suitably secured thereon by means of a nut 44.

Conventional spool type hydrostatic bearing arrangements, generally indicated at 45–48, are preferably arranged to maintain the spool in a free-floating position in the housing. Other types of conventional bearing arrangements may be utilized in lieu of the hydrostatic bearings. Clearances for the bearings located between the spool and housing are enlarged for illustration purposes. Since hydrostatic bearing arrangements are well known in the art further discussion thereof will not be made.

Pump or supply pressure is communicated to centrally disposed valve means 31 and 32 via high fluid pressure inlet means 49. Such fluid pressure is thus prevalent in V-shaped chambers 35 and 36 of such valve means. Either or both of the valve means will expand in the above explained manner when such fluid pressure exceeds that in chamber 34 and 37 by a predetermined level. The relieved fluid pressure will then flow to outlet ports 50 or 51 for purposes hereinafter explained.

Valve means 30 and 33 function as pressure relief valves to relieve excess fluid pressure to a reservoir (not shown) via exhaust ports 52 and 53. Thus the fluid pressure in the outlet ports will be maintained at a predetermined, maximum level. Ports 54 and 55 are arranged to subject opposite ends of the spool to differential control pressures during machine tool operation. It can be seen, for example, that if the fluid pressure in a first actuating chamber 56 becomes greater than the fluid pressure in a second actuating chamber 57 that the spool will move rightwardly. Such movement will function to simultaneously compress valve means 30 and 32 to set them at a first pressure relief level. Simultaneously therewith, the spring pressures afforded by valve means 31 and 33 will be relaxed to the same degree to set them at a second pressure relief level lower than the first one.

Thus, fluid pressure in outlet port 50 will increase relative to the fluid pressure prevalent in outlet port 51. In particular, "relaxed" valve means 35 and compressed relief valve means 34 will function to permit the fluid pressure in outlet port 50 to reach a higher level than the fluid pressure in outlet port 51, which decreases to a lower level simultaneously. In particular, valve means 36 is compressed and pressure relief valve means 37 is "relaxed." Assuming that all of the valve means are identically constructed and arranged, the compression and relaxation forces imparted thereto are identical in magnitude.

The differential fluid pressures in ports 50 and 51 will be communicated to opposite ends of servomotor 58 to move the spool thereof rightwardly to actuate machine tool 59. The magnitude of differential pressure is controlled by a control means 60, such as an electric-hydraulic transducer, suitably arranged to receive an input signal or force from power input means 61. A hydraulic pump may be operatively connected to the control means 60 to charge inlet ports 54 and 55 with a pressurized fluid. Upon a predetermined travel of the machine tool, feed back linkage means 62 will simultaneously function to actuate control means 60 to recenter servo-valve 39 to its neutral position, i.e. the fluid pressures in chambers 56 and 57 will be made equal.

It should be further understood that the FIG. 4 servo arrangement could be modified to directly actuate servo-valve 39. Such an arrangement would find follow-up linkage means 62 connecting machine tool 59 to housing 39, the housing being suitably mounted for axial movements relative to the spool of servo-valve 39. A manually actuated and calibrated wheel or lever, for example, could be mechanically connected to the spool to move it a predetermined amount for a particular machine tool operation. Inlet ports 54 and 55 could be retained solely for hydrostatic bearing purposes.

Other uses for the relief valve means of this invention are contemplated. For example, a three-way valve could be constructed by utilizing only one-half of the FIG. 4 structure. Also, each valve means when used in combination with additional valve means could be constructed and arranged to exhibit its own relief valve characteristics. For example, one valve means could be arranged to relieve pressure at 1000 p.s.i. whereas a second valve means could be arranged to relieve pressure at 2000 p.s.i. Otherwise stated, the above-discussed design parameters, such as spring rate, could be varied for each set of washers employed in the valve means.

I claim:

1. In a relief valve comprising an inlet means for communicating pressurized fluid to said valve, a valve means comprising at least one pair of Belleville type resilient washers arranged to have peripheral portions thereof contact each other and further arranged to form a chamber therebetween, said chamber arranged to communicate with said inlet means, mounting means non-attachably mounting said washers for limited axial movement thereon and adjusting means operatively associated with said valve means for selectively compressing said washers to adjust and set said washers for expansion whereby when fluid pressure in said chamber exceeds a predetermined level said washers will expand to permit fluid to flow therethrough.

2. The invention of claim 1 wherein said relief valve is arranged in a pressure relief valve, said pressure relief valve having an outlet means arranged to receive pressurized fluid from said inlet means and a relief port means arranged to receive fluid flowing through said washers when said washers expand.

3. The invention of claim 1 wherein said relief valve further comprises a housing and said adjust means comprises a member adjustably mounted for axial movements in said housing.

4. The invention of claim 3 wherein said member is threadably attached to said housing.

5. The invention of claim 1 wherein said valve means comprises at least two pairs of resilient washers arranged in stacked relationship with respect to each other, a washer of a first one of said pairs of washers having inner portions thereof arranged to abut adjacent inner portions of a washer of the second one of said pairs of washers.

6. The invention of claim 1 wherein said washers are circular and have means forming circular apertures therethrough.

7. The invention of claim 1 wherein at least one of said washers is chamfered at the peripheral portions thereof to provide a substantial line contact with the other one of said washers.

8. The invention of claim 1 wherein said mounting means comprises a tubular shank, said shank having means forming slots on the periphery thereof arranged to communicate with said inlet means and said chamber.

9. The invention of claim 6 wherein the outside diameters of said washers are approximately within a range of from one and one-quarter to four times the diameters of said circular apertures.

10. The invention of claim 1 wherein said washers are further arranged so that said chamber forms a V-shaped cross-section.

11. The invention of claim 1 wherein the axial length of each of said washers is selected from a range approximating from one and one-half to three times the wall thickness of each washer.

12. The invention of claim 1 wherein said relief valve is arranged in a servo arrangement, said servo arrangement comprising a servo-valve incorporating said valve means therein.

References Cited

UNITED STATES PATENTS

| | | | |
|---|---|---|---|
| 2,505,757 | 5/1950 | Dunbar et al. | 137—512.1 |
| 2,636,510 | 4/1953 | Mercier et al. | 137—512.1 |
| 2,851,054 | 9/1958 | Campbell et al. | 137—512.1 |
| 3,068,898 | 12/1962 | Meddock | 137—596.14 |
| 3,133,557 | 5/1964 | Gongwer | 137—512.1 |

FOREIGN PATENTS

| | | |
|---|---|---|
| 20,090 | 1910 | Great Britain. |
| 1,164,776 | 3/1964 | Germany. |

PAUL E. MASLOUSKY, Primary Examiner.

U.S. Cl. X.R.

137—512.1, 625.66, 596.12, 596.13; 91—368, 468